Dec. 5, 1967   H. R. CAMENZIND   3,356,946
GATE SENSITIVITY METERS FOR SILICON CONTROLLED
RECTIFIERS OR THE LIKE
Filed March 23, 1966

INVENTOR
HANS R. CAMENZIND
BY
Robert Levine
ATTORNEY

United States Patent Office 3,356,946
Patented Dec. 5, 1967

3,356,946
GATE SENSITIVITY METERS FOR SILICON CONTROLLED RECTIFIERS OR THE LIKE
Hans R. Camenzind, Lexington, Mass., assignor to P. R. Mallory & Co. Inc., Indianapolis, Ind., a corporation of Delaware
Filed Mar. 23, 1966, Ser. No. 536,928
8 Claims. (Cl. 324—158)

ABSTRACT OF THE DISCLOSURE

An AC source is connected across an SCR and a peak-reading voltmeter. In one form, an adjustable resistor is connected between the anode and gate of this SCR for measurement of the gate parameters of this SCR. In another form, the SCR to be tested is connected to a DC source and to the gate of the first SCR; gate power for the SCR under test is taken from an adjustable voltage means connected across the first SCR.

The present invention relates to a gate sensitivity meter and more particularly to the means and methods for providing a meter for measuring the gate sensiiviy of semiconductive devices of the type having an anode electrode, a cathode electrode, and a gate electrode for controlling conduction from said anode electrode to said cathode electrode.

The silicon controlled rectifier, now used widely in power control, voltage conversion, and switching applications, is a three-terminal device with characteristics similar to that of the gas-thyratron. That is, a current between the anode and cathode of a silicon controlled rectifier can be controlled with the third electrode, the gate. Specifically, a silicon controlled rectifier is a four-layer semiconductor device with two main conducting terminals and a gate, or trigger, terminal. It contains junctions that are intended to block all current in a reverse direction, block current flow in the forward direction under normal or ungated conditions, and allow forward current flow when the gate is energized or triggered.

The amount of current and voltage necessary between the gate and cathode to trigger the silicon controlled rectifier into conduction is a very significant operating parameter. The accurate measurement of this parameter is, therefore, of importance not only to the manufacturers of silicon controlled rectifiers but also to circuit designers. At the present time, gate current and gate voltage to trigger a silicon controlled rectifier are measured by applying a predetermined fixed direct current voltage at the anode electrode and variable current or voltage at the gate electrode. The gate current or voltage is manually increased and measured at the point where the silicon controlled rectifier is triggered. This procedure is slow and inaccurate.

Accordingly, there is presented in this specification a meter for automatically and accurately measuring both gate current and gate voltage necessary to trigger a silicon controlled rectifier. Hence, the gate sensitivity will be determined.

It is an object of the present invention, therefore, to provide a meter for automatically and accurately measuring the gate current and gate voltage necessary to trigger a silicon controlled rectifier.

It is another object of the present invention to provide a meter that will automatically and accurately measure the gate current and gate voltage necessary to trigger a silicon controlled rectifier and which does not require a regulated direct current power supply.

It is a further object of the present invention to provide a circuit including a peak reading voltmeter for determining the gate current and gate voltage necessary to trigger a silicon controlled rectifier.

It is still another object of the present invention to provide a meter for determining the gate current and gate voltage necessary for triggering a silicon control rectifier and which will operate with a half-wave current input.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which.

Generally speaking, the present invention is a meter for measuring the gate sensitivity of a semiconductive device of the type having an anode electrode, a cathode electrode, and a gate electrode for controlling conduction from said anode electrode to said cathode electrode, said meter comprising: a voltage source; first circuit means for connecting said voltage source to an anode electrode of a device to be tested; second circuit means for connecting a cathode electrode of said device to be tested to said voltage source; third circuit means for connecting said anode electrode to a gate electrode of said device to be tested, said third circuit means including an adjustable means for varying the current applied to said gate electrode; and a peak reading voltmeter connected across said device to be tested for establishing the peak anode voltage.

A more specific embodiment of the present invention would be a meter for measuring the gate sensitivity of a semiconductive device of the type having an anode electrode, a cathode electrode, and a gate electrode for controlling conduction from said anode electrode to said cathode electrode, said meter comprising: a constant voltage source; first circuit means for connecting an anode electrode of a device to be tested to a positive side of said constant voltage source; second circuit means for connecting a cathode electrode of said device to be tested to a negative side of said constant voltage source; a second voltage source; an electronic switching device having an anode electrode, cathode electrode, and a gate electrode, said electronic switching device being connected across said second voltage source; third circuit means for connecting said anode electrode of said electronic switching device to a gate electrode of said device to be tested, said third circuit means including an adjustable means for varying the current applied to said gate electrode of said device to be tested; fourth circuit means for connecting said gate electrode of said switching device to said device to be tested so as to turn on said switching device when said device to be tested starts to conduct; and a peak reading voltmeter connected across said electronic switching device for establishing the peak anode voltage.

Figure 1:
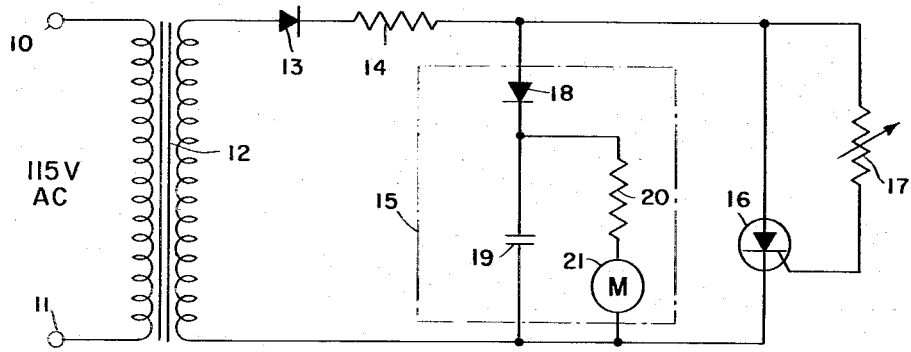
FIGURE 1 is a schematic of the circuit for determining the gate sensitivity of a silicon controlled rectifier.

Referring now to the drawing, and particularly to the schematic of FIGURE 1, the components and circuitry of the present invention can be visualized in conjunction with the following description.

The 115 VAC input to the meter circuit is provided to the terminals 10 and 11 across the primary coil of the transformer 12. The diode 13 and the resistor 14 are connected in series to a first side of the secondary coil of the transformer 12. The resistor 14 is also connected to the peak reading voltmeter 15, to the anode of the silicon controlled rectifier to be tested 16, and to the adjustable resistor 17. The adjustable resistor 17 is connected between the anode electrode and the gate electrode of the silicon controlled rectifier 16. The cathode of the silicon controlled rectifier 16 is connected to the peak reading voltmeter 15 and the second side of the secondary coil of the transformer 12. The peak reading voltmeter 15 is comprised of the diode 18, capacitor 19, resistor 20, and a typical multimeter 21.

Figure 2:
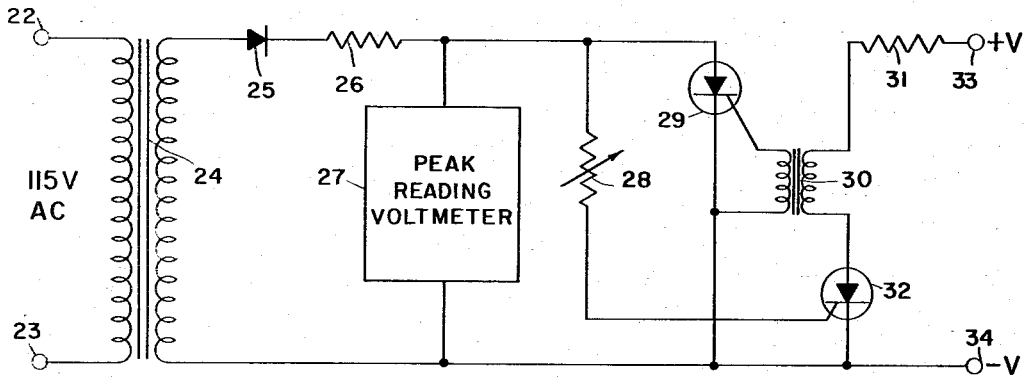
FIGURE 2 is a slightly more elaborate circuit for determining the gate sensitivity of a silicon controlled rectifier.

Referring now to FIGURE 2, a more elaborate meter circuit can be discussed.

The 115 VAC supply is provided to the terminals 22 and 23 across the primary coil of the transformer 24. The diode 25, resistor 26, and the peak reading voltmeter 27 are connected in series across the secondary coil of the transformer 24. The resistor 26 is connected to the anode of the silicon controlled rectifier 29 and through the resistor 28 to the gate of the silicon controlled rectifier 32. The cathodes of the silicon controlled rectifiers 29 and 32 are connected to the negative power supply terminal 34. The secondary coil of the transformer 30 is connected between the gate electrode and cathode electrode of the silicon controlled rectifier 29. There is a resistor 31 connected between the positive voltage supply terminal 33 and a first side of the primary coil of the transformer 30. The second side of the primary coil of the transformer 30 is connected to the anode of the silicon controlled rectifier 32.

Figure 3:
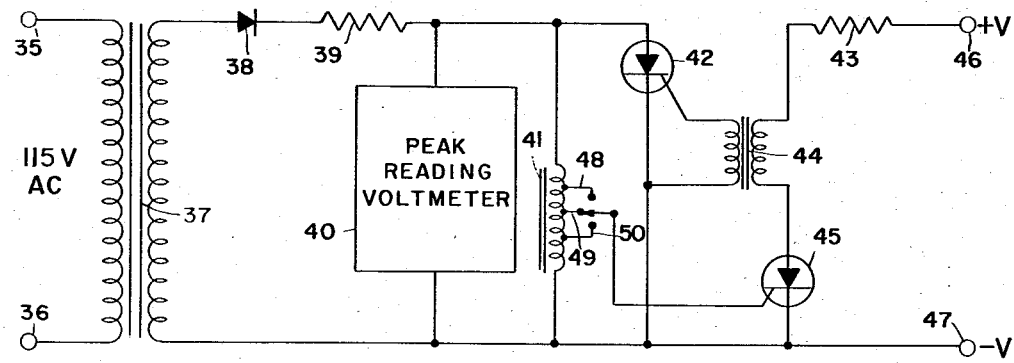
FIGURE 3 is a third circuit for determining the gate sensitivity of a silicon controlled rectifier.

Referring now to FIGURE 3, a third embodiment of the present invention can be discussed.

The 115 VAC supply is provided to the terminals 35 and 36 across the primary coil of the transformer 37. The diode 38, resistor 39, and peak reading voltmeter 40 are connected in series across the secondary coil of the transformer 37. The coil of the transformer 41 is connected across the peak reading voltmeter 40. There are three selector taps 48, 49 and 50 on the transformer 41. The gate of the silicon controlled rectifier 25 is connected to one of the taps 48, 49, or 50. The resistor 39 is connected to the anode of the silicon controlled rectifier 42. The cathode of the silicon controlled rectifier 42 is connected to the negative voltage terminal 47. The secondary coil of the transformer 44 is connected between the gate electrode and cathode electrode of the silicon controlled rectifier 42. A first side of the primary coil of the transformer 44 is connected through the resistor 43 to the positive voltage terminal 46. The second side of the primary coil of the transformer 44 is connected to the anode of the silicon controlled rectifier 45. The cathode of the silicon controlled rectifier 45 is connected to the negative voltage terminal 47.

With the above description of circuitry in mind, and by making reference to the drawing figures, the following analysis of operation will serve to convey the functional details of the present invention.

The first illustrative embodiment of the present invention is shown in FIGURE 1. In the meter circuit of FIGURE 1, half-wave current is applied through the resistor 14 to the anode of the silicon controlled rectifier 16 and through the adjustable resistor 17 to the gate of the silicon controlled rectifier 16. As the voltage increases during the first portion of the half cycle wave, half-wave current will flow into the gate of the silicon controlled rectifier 16. When this gate current reaches the trigger level of the silicon controlled rectifier 16, the silicon controlled rectifier 16 will start conducting and the anode voltage will drop to about one volt. The voltage across the capacitor 19 in the peak reading voltmeter 15 will remain at a level which the anode voltage reached just prior to the triggering of the silicon controlled rectifier 16. Therefore, the gate current required to fire the silicon controlled rectifier 16 is calculated by dividing the voltage across the capacitor 19 by the value of the adjustable resistor 17. The voltage across the capacitor 19 is read directly from the multimeter 21.

The accuracy of the aforementioned calculation merely depends on the accuracy of the adjustable resistor 17 and the peak reading voltmeter 15. No regulated direct current power source is necessary.

Referring now to FIGURE 2, a more elaborate gate sensitivity meter circuit can be discussed. The anode voltage of the silicon controlled rectifier under test 32 is held constant via the direct current power source provided across the terminals 33 and 34. The gate current for the silicon controlled rectifier 32 flows through the adjustable resistor 28. As the gate current reaches a level sufficient to trigger the silicon controlled rectifier 32, current will flow through the silicon controlled rectifier 32 and, consequently, the primary coil of the transformer 30 and the resistor 31. Since, the secondary coil of the transformer 30 is connected between the gate electrode and the cathode electrode of the silicon controlled rectifier 29, the silicon controlled rectifier 29 will conduct to reduce the voltage on the anode of the silicon controlled rectifier 29 to ground potential. The voltage on the anode of the silicon controlled rectifier 29 is also the gate voltage source for the silicon controlled rectifier 32. The maximum value of this anode voltage can be read directly from the peak reading voltmeter 27. The gate current is calculated by dividing the voltage reading by the value of the adjustable resistor 28.

Referring now to FIGURE 3, the operation of the third illustrative embodiment can be discussed. In this embodiment the gate voltage to the silicon controlled rectifier to be tested 45 is provided through the selector taps of the transformer 41. As the silicon controlled rectifier 45 begins to conduct, the silicon controlled rectifier 42 will be triggered as result of the current flowing through the primary coil (and induced in the secondary coil) of the transformer 44. When the silicon controlled rectifier 42 starts to conduct, the anode voltage for the silicon controlled rectifier 42 will be reduced to ground potential. This voltage can be read directly from the peak reading voltmeter 40. The gate voltage for the silicon controlled rectifier 45 is determined simply by the peak voltage reading and the turns-ratio of the transformer 41. In FIGURE 3, the anode voltage of the silicon controlled rectifier to be tested (45) is also held constant by the direct current voltage source applied across the terminals 46 and 47.

The three illustrative embodiments of the present invention have been built and tested. The results show that gate current to trigger from 3 microamperes to 300 microamperes and gate voltage to trigger from 0.1 to 10 volts can be measured with an accuracy better than ±2%.

The meter circuitry of the present invention, as hereinbefore described in three embodiments, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

What is claimed is:

1. A meter for measuring the gate sensitivity of a semiconductive device of the type having an anode electrode, a cathode electrode, and a gate electrode for controlling conduction from said anode electrode to said cathode electrode, said meter comprising: an AC voltage source; first circuit means for connecting said voltage source to an anode electrode of a device to be tested; second circuit means for connecting a cathode electrode of said device to be tested to said voltage source; third circuit means for connecting said anode electrode to a gate electrode of said device to be tested, said third circuit means including an adjustable means for varying the current applied to said gate electrode; and a peak reading voltmeter connected between the anode and the cathode of said device to be tested for establishing the peak anode voltage.

2. A meter as in claim 1 wherein said adjustable means for varying the current applied to said gate electrode is an adjustable resistor.

3. A meter as in claim 1 wherein said peak reading voltmeter comprises a diode connected in series with a capacitor across said voltage source and a multimeter for determining the peak voltage applied to said capacitor, said multimeter being connected across said capacitor.

4. A meter as in claim 1 wherein said voltage source is a half-wave rectifying network connected across an alternating current voltage source.

5. A meter for measuring the gate sensitivity of a semiconductive device of the type having an anode electrode, a cathode electrode, and a gate electrode for controlling conduction from said anode electrode to said cathode electrode, said meter comprising: a constant voltage source; first circuit means for connecting an anode electrode of a device to be tested to a positive side of said constant voltage source; second circuit means for connecting a cathode electrode of said device to be tested to a negative side of said constant voltage source; and AC voltage source; an electronic switching device having anode and cathode electrodes connected across said second voltage source and having a gate electrode; third circuit means for connecting said anode electrode of said electronic switching device to a gate electrode of said device to be tested, said third circuit means including an adjustable means for varying the current applied to said gate electrode of said device to be tested; fourth circuit means for connecting said gate electrode of said switching device to said device to be tested so as to turn on said switching device when said device to be tested starts to conduct; and a peak reading voltmeter connected between the anode and the cathode of said electronic switching device.

6. A meter as in claim 5 wherein said fourth circuit means is a transformer having a primary winding and a secondary winding, said primary winding being connected between said constant-voltage source and the anode of said device to be tested, said first circuit means and said secondary winding being connected across said gate electrode and said cathode electrode of said switching device.

7. A meter as in claim 5 wherein said adjustable means is an adjustable resistor.

8. A meter as in claim 5 wherein said adjustable means is a transformer having a plurality of selector taps for providing current to said gate electrode of said device to be tested.

References Cited

G.E. SCR Manual (Second Edition), December 1961, pages 39, 40.

RUDOLPH V. ROLINEC, *Primary Examiner.*

E. L. STOLARUN, *Assistant Examiner.*